(12) United States Patent
Dalakos et al.

(10) Patent No.: US 7,184,200 B2
(45) Date of Patent: Feb. 27, 2007

(54) PASSIVE BROADBAND INFRARED OPTICAL LIMITER DEVICE BASED ON A MICRO-OPTOMECHANICAL CANTILEVER ARRAY

(75) Inventors: George Dalakos, Niskayuna, NY (US); Peter Lorraine, Niskayuna, NY (US); Pingfan Wu, Niskayuna, NY (US); Brian Lawrence, Clifton Park, NY (US); William Taylor Yenisch, Longwood, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 98 days.

(21) Appl. No.: 11/012,342

(22) Filed: Dec. 16, 2004

(65) Prior Publication Data

US 2006/0131500 A1   Jun. 22, 2006

(51) Int. Cl.
*G02B 26/08* (2006.01)
*G01J 5/00* (2006.01)

(52) U.S. Cl. .................................. 359/298; 250/338.1

(58) Field of Classification Search ............... 250/332, 250/338.1, 347, 353; 252/587; 359/222, 359/290, 298; 372/4
See application file for complete search history.

(56) References Cited

U.S. PATENT DOCUMENTS

| | | | | |
|---|---|---|---|---|
| 4,093,353 A | * | 6/1978 | Lang | 359/243 |
| 4,768,864 A | * | 9/1988 | Wu et al. | 349/197 |
| 4,776,677 A | * | 10/1988 | Park et al. | 359/241 |
| 5,017,769 A | * | 5/1991 | Cohn et al. | 250/216 |
| 5,080,469 A | * | 1/1992 | McCahon et al. | 359/241 |
| 5,283,697 A | * | 2/1994 | Tutt et al. | 359/885 |
| 5,347,395 A | | 9/1994 | Lautenschlager et al. | |
| 5,449,904 A | * | 9/1995 | Miller et al. | 250/216 |
| 5,561,541 A | * | 10/1996 | Sharp et al. | 349/104 |
| 5,589,101 A | | 12/1996 | Khoo | |
| 6,297,918 B1 | * | 10/2001 | Justus et al. | 359/886 |
| 6,307,202 B1 | * | 10/2001 | Manalis et al. | 250/347 |
| 6,392,233 B1 | | 5/2002 | Channin et al. | |
| 6,822,788 B2 | * | 11/2004 | Blitstein | 359/350 |

OTHER PUBLICATIONS

Perazzo et al., "Infrared vision using uncooled micro-optomechanical camera," Applied Physics Letters, vol. 74, No. 23, Jun. 7, 1999
Danilov, et al., "Effect of intense laser radiation on controlled VO2 mirrors," J. Opt. Technol., vol. 67, Jun. 2000, pp. 526-531.

(Continued)

*Primary Examiner*—David N. Spector
(74) *Attorney, Agent, or Firm*—Birch, Stewart, Kolasch & Birch, LLP

(57) ABSTRACT

An IR limiting device for a detector that is based on a micro-optomechanical cantilever array is disclosed. In the normal state, each microcantilever device in the array behaves like a mirror that reflects the infrared signal to the detector. The microcantilever device absorbs radiation outside the desired infrared region. When the radiation is stronger than a predetermined threshold, the microcantilever device bends as a result of thermo-mechanical forces, and it reflects the signal away from the detector, thereby limiting the radiation. The advantage of such a system is that each pixel in the detector can be addressed individually, and the limiting is localized.

21 Claims, 3 Drawing Sheets

OTHER PUBLICATIONS

Segaud, et al., "VO2 nad AU-VO2 Thin Films Prepared By Sputtering and Sol-Gel for Infrared Optical Power Limiting," Nonlinear Optics, 1999, vol. 21, pp. 211-224.

Mikheeva et al., "Features of the limitation of laser radiation by mirrors based on vanadium dioxide" J. Opt. Technol. 68 (4), Apr. 2001, pp. 278-281.

Oden et al., "Uncooled thermal imaging using a piezoresistive microcantilever," Appl. Phys. Lett. 69 (21) Nov. 18, 1996, pp. 3277-3279.

Manalis, et al., "Two-dimensional micromechanical bimorph arrays for detection of thermal radiation," Appl. Phys. Lett. 70 (24), Jun. 16, 1997, pp. 3311-3313###.

De Natale, J.F., "Thin Film Optical Switching Materials," Mat. Res. Soc. Symp. Proc. vol. 374, Materials Research Society, C1995, pp. 87-97.

Konovalova, et al., Interference systems of controllable mirrors based on vanadium dioxide for the spectral range 0.6-10.6 um, J. Opt. Technol. 66 (5), May 1999, pp. 391-398.

Suh, et al., "Semiconductor to metal phase transition in the nucleation and growth of VO2 nanoparticles and thin films," Journal of Applied Physics, vol. 96 (2),Jun. 15, 2004, pp. 1209-1213.

LoPresti, et al., "All-Optical Switching of Infrared Optical Radiation Using Isotropic Liquid Crystal," IEEE Journal of Quantum Electronics, vol. 31, No. 4, Apr. 1995, pp. 723-728.

* cited by examiner

PASSIVE BROADBAND INFRARED OPTICAL LIMITER DEVICE BASED ON A MICRO-OPTOMECHANICAL CANTILEVER ARRAY

BACKGROUND OF THE INVENTION

1. Field of the Invention

The present invention relates to an infrared optical limiter, and more specifically, to a passive broadband infrared optical limiter device based on an array of micro-optomechanical cantilevers that bend as a result of thermo-mechanical forces.

2. Description of the Related Art

There is a need for a broadband passive infrared optical power limiting device. In the present application, the wavelengths of the infrared spectrum will be referred to as the mid wavelength IR (mid IR, wavelength 3 to 5 microns) region and the long wavelength infrared (LWIR, wavelength 7 to 14 microns) region. Such an infrared optical limiter would be useful for protecting light sensitive items, such as the human eye, a photodetector or a camera against unexpectedly strong illumination. An ideal optical limiter is transparent under low level illumination at the wavelength of interest, but "dark" under strong incident light power. The optical signal power transmitted through an optical limiter is ideally constant, irrespective of the incident power, when the incident signal power is higher than optical limiter threshold. It is also desirable for an optical limiter to have a low initiating threshold and broad spectral range.

Optical limiting techniques using reverse saturable absorbers (RSA) solutions and multi-photon absorbers dyes are well known in the art. The disadvantage of these materials as limiters includes a high incident fluence threshold which the optical limiting behavior begins. More importantly, however, there are no known RSA or multi-photon solutions that can be used in the mid IR and LWIR regions.

Others have proposed using a vanadium oxide interference mirror for optical limiting in the infrared region. See for example, O. P. Konovalova, Al. Sidorov, "Interference systems of controllable mirrors based on vanadium dioxide for the spectral range of 0.6–10.6 µm", J. Opt. Technol., 66(5), p. 391 (1999). The Konovalova et al. device is based on a vanadium oxide film that absorbs incident laser energy and changes phase. The main function of this limiter is laser hardening, and it is a relatively narrowband device that is not suitable for handling a broadband of wavelengths. It has an initiating threshold on the order of 1 MW/cm$^2$, which is too high for the mid IR and LWIR range. A suitable mid IR and LWIR range limiter must limit a continuous wave source, having a broad band spectrum (continuously from 3 to 14 microns wavelength), but having relatively low peak power (~1 W/cm2) radiation.

Others have proposed using microcantilever devices to make an infrared focal plane array sensor. See for example, P. I. Olden, and et. al., "Uncooled thermal imaging using a piezoresistive microcantilever," Appl, Phys. Lett. 69 (21), 3277 (1996); and T. Perazzo, and et. al., "Infrared vision using uncooled micro-optomechanical camera," Appl., Phys. Lett., 74(23), 3567 (1999). Another example of microcantilever devices is disclosed in U.S. Pat. No. 6,392,233 (Channin et al.) which is entitled "Optomechanical Radiant Energy Device". The Channin et al. device is a radiant energy detector built from microcantilever devices. Although the use of microcantilever devices as a detector is well known in the art, the use of microcantilever devices as an infrared limiter appears to be unknown in the art.

SUMMARY OF THE INVENTION

The present invention relates to an infrared limiting device based on a micro-optomechanical cantilever array that is particularly well suited for limiting the radiation impinging upon a detector in the normal state, each microcantilever device in the array behaves likes a mirror to reflect the infrared radiation to the detector. The microcantilever device absorbs radiation outside the mid IR or LWIR region. When the radiation is stronger than a predetermined threshold, the microcantilever device bends as a result of thermo-mechanical forces, and it reflects the radiation away from the detector, thereby limiting the radiation impinging upon the detector. An advantage of the present system is that each pixel of the detector can be addressed individually, and the limiting is localized.

DETAILED DESCRIPTION OF THE INVENTION

One of the goals of the present invention is to protect an infrared device such as a LWIR camera against damage from continuous wave (CW), broadband radiation, such as radiation from the sun. The present invention, however, is not limited to LWIR devices, and it is suitable for use with mid IR devices. Because of the high temperature and brightness, continuous wave radiation can be more harmful to the detector than a pulsed, narrow bandwidth laser. On the other hand, because of its high temperature, the continuous wave radiation has a hundred times more energy in the visible and near IR spectrum than in the mid IR or LWIR region. So the approach of this invention is to use the energy from visible and near IR region to operate the limiter in the LWIR or mid IR.

Figure 1:
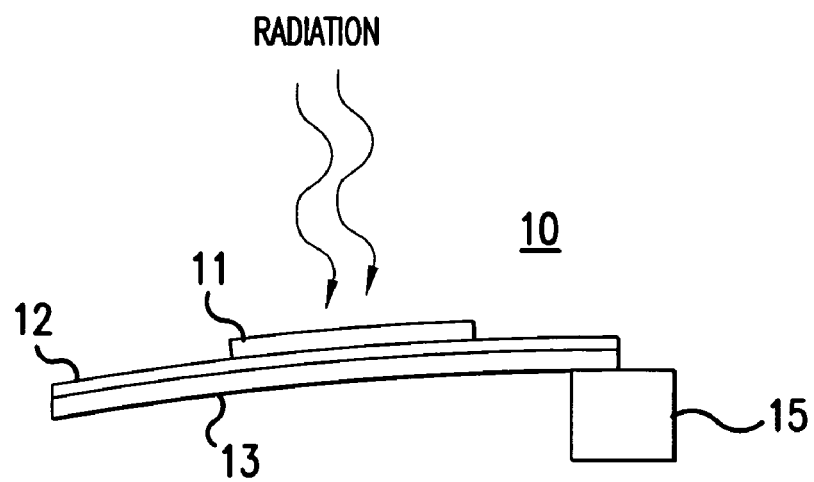
FIG. 1 is a side view of a microcantilever device included in the infrared limiter of the present invention.

Referring now to FIG. 1, the main component of the infrared limiter of the present invention is a microfabricated cantilever 10 and a mirror 11. The microcantilever 10 includes strips 12, 13 of different materials that have a common anchor 15. In normal operation, a desired radiation within the 3 to 14 microns wavelength region (primary radiation) is reflected off the mirror 11 to a detector or an infrared focal plane array (IRFPA), in the manner shown in FIG. 3. The mirror 11 also absorbs radiation in all wavelength regions of less than 3 microns (secondary radiation). When the secondary radiation is higher than a predetermined threshold, the cantilever 10 bends and reflects the signal away from the detector, thereby limiting detection. The cantilever bends as a result of thermo-mechanical forces. Preferably, the threshold intensity which triggers the bending is energy in the range of 100–200 watts per cm$^2$ that is absorbed by the cantilever 10. The temperature sensitivity of the cantilever 10 arises due to different thermal expansion coefficients of the materials in the layered structure or a differential expansion from a temperature gradient within the vertical depth of the profile of the cantilever 10. Exposure to radiation induces vertical deflection of the cantilever 10.

Figure 2:
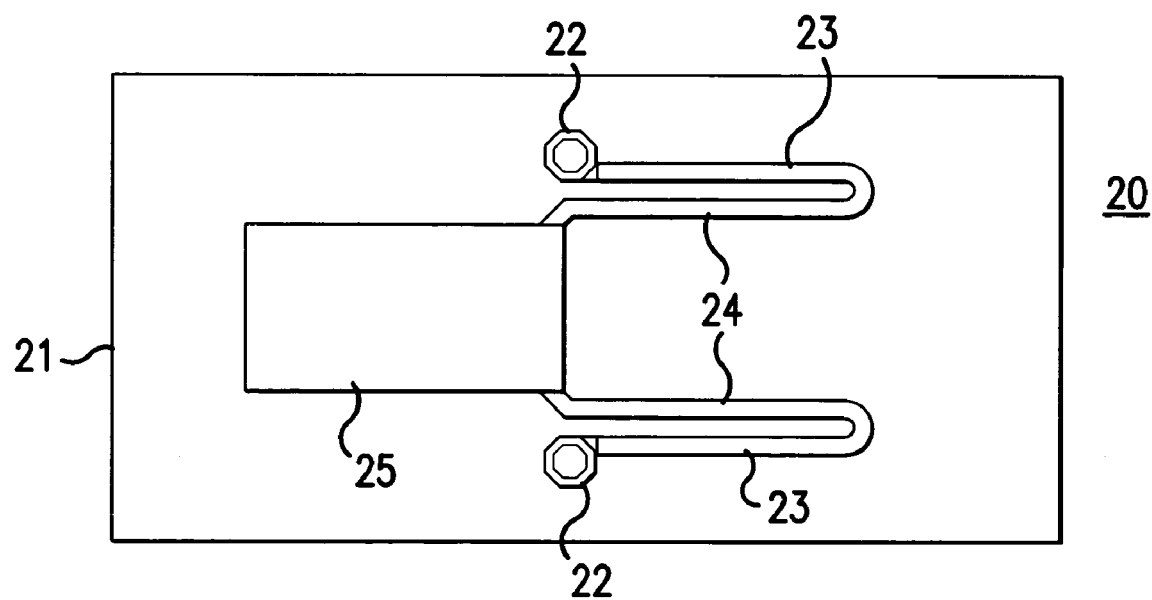
FIG. 2 is a top view of an alternative embodiment of a microcantilever device having bimetallic bending arms.
Figure 3:
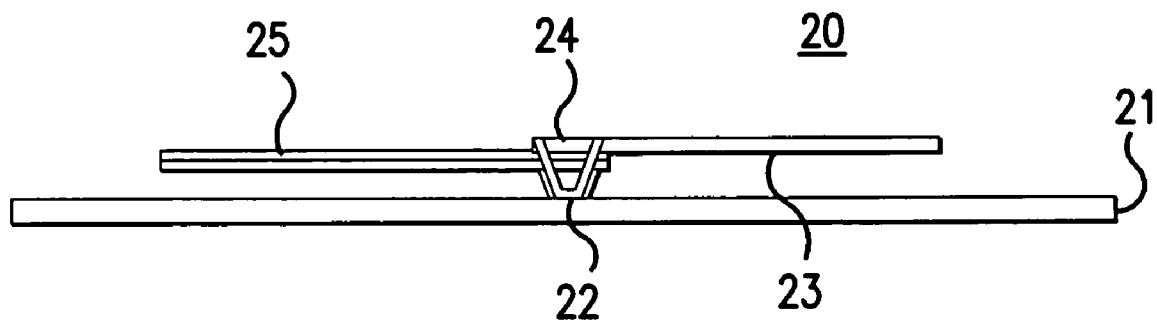
FIG. 3 is a side view of the microcantilever device having bimetallic bending arms of FIG. 2.

Referring now to FIGS. 2 and 3, the same effect can be achieved using a bimetallic film. In FIGS. 2 and 3, a microcantilever device 20 is disposed upon a silicon substrate 21. The microcantilever device 20 includes anchors 22 which connect thermal isolation arms 23 to the substrate 21. The thermal isolation arms 23 are connected to bimetallic bending arms 24. Dissimilar materials such as gold (coefficient of linear thermal expansion $\alpha=14.2\times10^{-6}$ m/m*K) and zinc ($\alpha=29.7\times10^{-6}$ m/m*K) are plated upon the bending arms 24 of the cantilever structure. Other materials of choice include copper ($\alpha=16.5\times10^{-6}$ m/m*K), iron ($\alpha=12\times10^{-6}$ m/m*K), and aluminum ($\alpha=22.2\times10^{-6}$ m/m*K) The bending arms are in turn connected to an absorbing paddle 25 having a mirror or reflective surface. In the side view of FIG. 3, the absorbing paddle 25 is clearly illustrated as being cantilevered. The cantilevered absorbing paddle 25 reflects the mid IR or LWIR radiation on to a detector and absorbs the visible and near IR radiation. An example material of paddle 25 is a chalcogenide glass ($As_xGe_ySe_z$) coated on top of a reflective metal layer. The chalcogenide glass absorbs visible and near IR light, but transmits the mid IR or LWIR signal.

In the devices 10, 20 of FIGS. 1 and 2, the visible and near IR radiation is absorbed by the microcantilever devices 10, 20 and converted into a cantilever mirror deflection. The dimension of each cantilever pixel is on the order of 100 microns by 100 microns. The microcantilever devices 10, 20 can preferably deflect the light at an angle up to approximately 5 degrees. The total reflection by the limiter depends on the micro-device's filling factor and can be as high as 95%.

Figure 4:
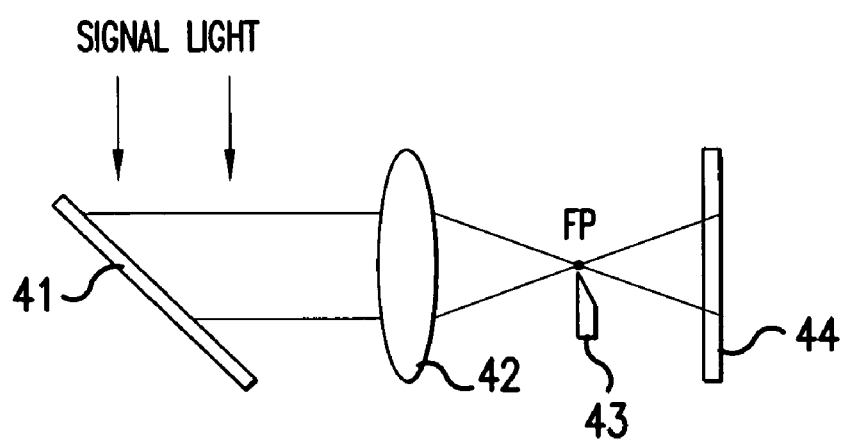
FIG. 4 is a schematic drawing of the infrared limiter system of the present invention.

Referring now to FIG. 4, there is an illustration of a schematic system for limiting the incoming radiation. When the incoming radiation is below a predetermined threshold the radiation is reflected off the microcantilever array 41 and directed through a focusing lens 42. The focused radiation passes a knife edge 43 disposed adjacent to a focal point FP of the focusing lens 42, and the focused radiation is directed onto a detector 44. However, when the radiation is above the predetermined threshold, the individual microcantilever devices of the microcantilever array 41 deflect the radiation. After passing through the imaging lens 42, the deflected radiation will travel downward and away from the focal point FP of the lens 42. The knife edge 43, adjacent to the focal point, blocks the deflected radiation. The actual distance from the focal point FP of the lens 42 to the knife edge 43 depends upon the image system numerical aperture, cantilever deflection angle (~5°) and the image lens focal length. As an example, if the lens focal length is 100 mm, the distance can be on the order of 8 mm.

Figure 5:
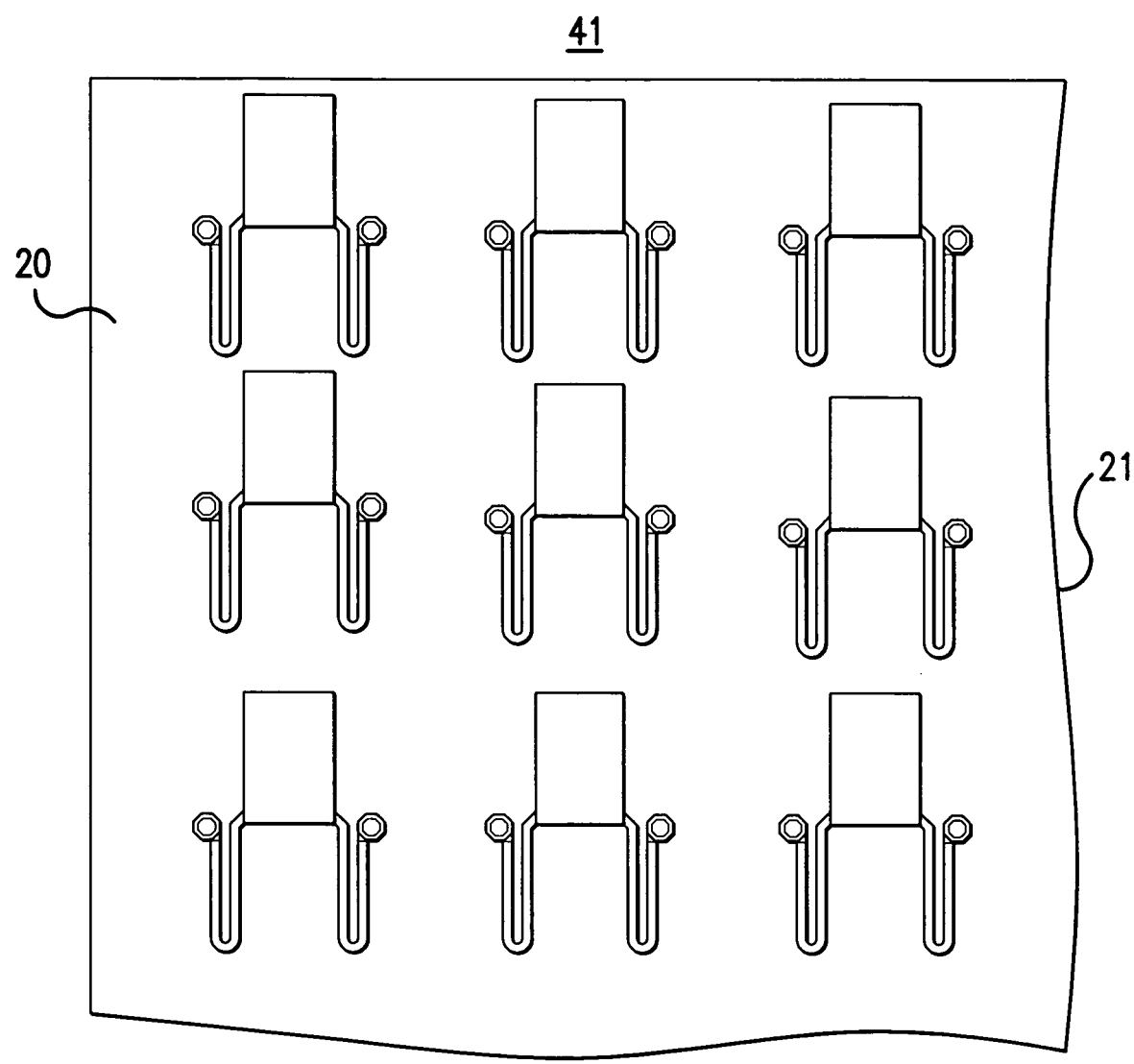
FIG. 5 is an illustration of the microcantilever array of FIG. 4.

Referring now to FIG. 5, the microcantilever array 41 of FIG. 4 is illustrated in more detail. The microcantilever array 41 includes a silicon substrate 21 and a plurality of microcantilever devices 20. Only nine microcantilever devices 20 are illustrated, but in a full array there would be an individual microcantilever device 20 for each corresponding pixel in the detector 44. If the detector 44 includes 320×240 pixels then there would be a total of 76,800 microcantilever devices in the array 41. Likewise, if the detector 44 includes 620×480 pixels then there would be a total of 307,200 microcantilever devices in the array 41.

From the description above, it can be appreciated that the IR limiter device of the present invention is a broadband device that covers the entire mid IR and LWIR region. Local heating caused by the impinging radiation results in the cantilever pixels being independently controlled. Accordingly, high radiation is addressed locally, while enabling the detector to still find a weak target in the other portions of the detector.

The present invention provides several advantages over the prior art. The IR limiter is a true passive device, but it can have a relatively quick response. The signal reflected by the limiter only depends on the filling factor of the cantilever array, which can be as high as more than 95%. Moreover, the IR limiter works for continuous wave, low peak intensity incident light.

The present invention is described as a broadband infrared limiter. It will be understood, however, that the above description is merely illustrative of the applications of the principles of the present invention, the scope of which is to be determined by the claims viewed in light of the specification. Other variants and modifications of the invention will be apparent to those of skill in the art.

We claim:

1. A device for limiting radiation, the radiation including at least primary radiation with wavelengths substantially in the range of about 3 to 14 microns and a secondary radiation with wavelengths substantially below the primary radiation comprising:
   a detector responsive to the primary radiation;
   a plurality of microcantilever devices disposed on a substrate, wherein the primary radiation is reflected from the microcantilever device and secondary radiation is absorbed; and
   wherein the microcantilever devices direct the primary radiation onto the detector when the secondary radiation is below a predetermined threshold, and deflect the primary radiation away from the detector when the secondary radiation exceeds the predetermined threshold.

2. A device according to claim 1 wherein the deflections of the microcantilever devices are caused by thermo-mechanical forces.

3. A device according to claim 1 wherein the deflections of the microcantilever devices are due to a differential expansion caused by a temperature gradient in a perpendicular direction with reference to the substrate.

4. A device according to claim 1 wherein the deflections of the microcantilever devices are caused by the heating of dissimilar materials that are plated upon the microcantilever devices.

5. A device according to claim 1 wherein the microcantilever devices include a reflective surface disposed on a cantilevered member that is comprised of different materials and anchored to the substrate.

6. A device according to claim 1 wherein the microcantilever devices include a reflective surface disposed on a paddle that absorbs visible light and near IR radiation, the paddle being connected to a pair of bending arms, that are connected to individual thermal isolation arms, that are anchored to the substrate.

7. A device according to claim 6 wherein the bending arms are plated with a bimetallic film.

8. A device according to claim 1 wherein the microcantilever devices are plated with dissimilar metals which are selected from the group comprising gold, zinc, iron, copper and aluminum.

9. A device according to claim 1 wherein the detector is selected from a group comprising the human eye, a photodetector and a camera.

10. A device according to claim 1 wherein only a portion of the microcantilever devices deflect the incoming radiation and the limiting is localized.

11. A device according to claim 1 wherein the microcantilever devices include a reflective surface made from chalcogenide glass.

12. A device according to claim 1 wherein the wavelengths of the primary band are in the 3 to 5 micron range.

13. A device according to claim 1 wherein the wavelengths of the primary band are in the 7 to 14 micron range.

14. An IR detection system, comprising:
an IR detector, responsive to radiation having infrared wavelengths of approximately 7 to 14 microns;
an array of microcantilever devices arranged to reflect the radiation onto the IR detector, wherein the microcantilever devices reflect the radiation onto the IR detector when the radiation is below a predetermined threshold, and the microcantilever devices deflect the radiation away from the detector when the radiation exceeds the predetermined threshold;
a lens for focusing the radiation from the array; and
a knife edge adjacent to the focal point of the lens to block the deflected radiation from impinging on the IR detector.

15. A method for limiting the amount of radiation impinging on an IR detector, responsive to radiation having infrared wavelengths of approximately 3 to 14 microns, comprising the steps of:
utilizing microcantilever devices to reflect the radiation towards the IR detector, when the radiation is below a predetermined threshold;
focusing the radiation toward the IR detector with a lens;
bending the microcantilever devices to deflect the radiation away from the detector when the radiation exceeds the predetermined threshold; and
utilizing a knife edge adjacent to the focal point of the lens to block the deflected radiation from impinging on the IR detector.

16. A method for limiting the amount of radiation impinging on a radiation sensitive device, responsive to radiation of interest having infrared wavelengths of approximately 3 to 14 microns, comprising the steps of:
directing radiation toward the radiation sensitive device which includes a microcantilever;
permitting the radiation to impinge upon the radiation sensitive device when the radiation is below a predetermined threshold; and
utilizing radiation, having wavelengths different from the radiation of the interest, to initiate the limiting of the radiation impinging upon the radiation sensitive device, when the predetermined threshold is exceeded.

17. A method according to claim 16 wherein the radiation of interest has wavelengths of approximately to 7 to 14 microns, and wherein the step of utilizing radiation includes utilizing radiation having wavelengths of 3 to 5 microns.

18. An IR detection system responsive to radiation, the radiation including at least a primary radiation band with wavelengths substantially in the range of about 7 to 14 microns and a secondary radiation band with wavelengths substantially below the primary radiation band, comprising:
an IR detector, responsive to the primary radiation;
an array of microcantilever devices arranged to direct the primary radiation onto the IR detector, wherein the microcantilever devices direct the primary radiation onto the IR detector when the secondary radiation is below a predetermined threshold, and the microcantilever devices direct the radiation away from the IR detector when the secondary radiation exceeds the predetermined threshold;
a lens for focusing the primary radiation from the array; and
a knife edge adjacent to the focal point of the lens to block the deflected radiation from impinging on the IR detector.

19. A method for limiting the amount of radiation, the radiation including at least a primary radiation band with wavelengths substantially in the range of about 7 to 14 microns and a secondary radiation band with wavelengths substantially below the primary radiation band, comprising:
providing an IR detector responsive to the primary radiation;
utilizing microcantilever devices to direct the primary radiation onto the IR detector, when the secondary radiation is below a predetermined threshold;
focusing the primary radiation toward the IR detector with a lens;
bending the microcantilever devices to direct the primary radiation away from the IR detector when the secondary radiation exceeds the predetermined threshold; and
utilizing a knife edge adjacent to the focal point of the lens to block the deflected radiation from impinging on the IR detector.

20. A method for limiting the amount of radiation, the radiation including at least a primary radiation band with wavelengths substantially in the range of about 7 to 14 microns and a secondary radiation band with wavelengths substantially below the primary radiation band, comprising:
providing a detector responsive to the primary radiation;
utilizing microcantilever devices to direct the primary radiation onto the detector, when the secondary radiation is below a predetermined threshold; and
bending the microcantilever devices to direct the primary radiation away from the detector when the secondary radiation exceeds the predetermined threshold.

21. A device according to claim 1 wherein the wavelengths of the secondary radiation band are less than 3 microns.

* * * * *